United States Patent [19]

Sakamoto et al.

[11] Patent Number: 4,941,628
[45] Date of Patent: Jul. 17, 1990

[54] LIFT GENERATING APPARATUS, IN AIRCRAFT EMPLOYING THE LIFT GENERATING APPARATUS, AND A LIFT GENERATING METHOD

[75] Inventors: Yujiro Sakamoto, Akashi; Toshio Kurosaka, Takarazuka; Hirohiko Fukumoto, Kobe; Toshiya Miyake; Hirohiko Tokunaga, both of Kakogawa, all of Japan

[73] Assignee: Kabushiki Kaisha Kobe Seiko Sho, Kobe, Japan

[21] Appl. No.: 305,019

[22] Filed: Feb. 2, 1989

[30] Foreign Application Priority Data

Feb. 2, 1988 [JP] Japan .................................. 63-23310
Jul. 20, 1988 [JP] Japan ................................ 63-180686

[51] Int. Cl.$^5$ ............................................ B64C 39/06
[52] U.S. Cl. ................................. 244/12.2; 244/23 C; 244/73 B
[58] Field of Search .................. 244/23 C, 12.2, 73 B, 244/73 C

[56] References Cited

U.S. PATENT DOCUMENTS

| | | | |
|---|---|---|---|
| 3,020,003 | 2/1962 | Frost et al. | 244/23 C |
| 3,224,711 | 12/1965 | Warren et al. | 244/23 C |
| 3,243,146 | 3/1966 | Clover | 244/23 C |
| 3,469,802 | 9/1969 | Roberts et al. | 244/12.2 |

FOREIGN PATENT DOCUMENTS

| | | | |
|---|---|---|---|
| 2055397 | 5/1972 | Fed. Rep. of Germany | 244/23 C |
| 83262 | 6/1964 | France | 244/12.2 |
| 61-268597 | 5/1985 | Japan . | |

Primary Examiner—Galen Barefoot
Attorney, Agent, or Firm—Oblon, Spivak, McClelland, Maier & Neustadt

[57] ABSTRACT

Disclosed is a lift generating appartus for an aircraft which includes a generally circular principal wing with its peripheral portion bent downward, forming a bowl-shaped space opening downward; a high-pressure gas producing device provided on the principal wing; a plurality of jet nozzles provided within the central portion of the bowl-shaped space in a circular arrangement at angular intervals to jet a high-pressure gas produced by the high-pressure gas producing device radially outward from the central portion of the bowl-shaped space; and suction openings for sucking the external air as a secondary fluid from outside the bowl-shaped space by suction generated by the ejector effect of the high-pressure gas jetted from the jet nozzles. The supply of the secondary fluid into the bowl-shaped space in addition to the high-pressure gas further increases the static pressure within the bowl-shaped space, so that the lift acting on the principal wing is enhanced. The high-pressure gas jetting rate of each jet nozzle is regulated to produce a horizontal thrust for horizontal flight.

13 Claims, 5 Drawing Sheets

LIFT GENERATING APPARATUS, IN AIRCRAFT EMPLOYING THE LIFT GENERATING APPARATUS, AND A LIFT GENERATING METHOD

BACKGROUND OF THE INVENTION

1. Field of the Invention

The present invention relates to a lift generating apparatus for travel in the air, an aircraft employing the lift generating apparatus, and a lift generating method.

2. Description of the Prior Art

A conventional lift generating apparatus for generating an upward thrust for aerial movement, particularly, for vertical aerial movement, employs rotors such as employed in a helicopter. The conventional lift generating apparatus employing rotors, however, has disadvantages that the rotation of the rotors entails dangers, the rotors generate large noises and the rotors are damaged easily by obstacles even when the rotors collide lightly against the obstacles.

Japanese Patent Laid-open (Kokai) No. 61-268597 discloses a lift generating apparatus which generates a negative pressure on the upper surface of a circular wing to generate lift by taking in air from the front of the circular wing by a turbofan to produce high-pressure air, guiding the high-pressure air through an L-shaped duct to the central portion of the upper surface of the circular wing, and jetting the high-pressure air radially from the central portion of the upper surface of the circular wing toward the periphery of the same.

This known lift generating apparatus, however, has disadvantages in that the high-pressure air jetted by high-speed airflows over the upper surface of the circular wing is dispersed in the atmosphere immediately after being jetted to become low-speed airflows. It is difficult to generate a sufficient negative pressure and hence it is difficult to generate a large lift, since the turbofan is unable to jet a sufficient amount of air.

SUMMARY OF THE INVENTION

Accordingly, it is an object of the present invention to provide a lift generating apparatus capable of generating a large lift by the pressure difference between a pressure generated on the upper surface of a wing by an airflow and a pressure generated on the lower surface of the wing, an aircraft employing the lift generating apparatus, and a lift generating method.

In one aspect of the present invention, a lift generating apparatus comprises a circular principal wing having a peripheral portion bent downward so as to form a bowl-shaped space opening downward, a high-pressure gas producing unit provided on the principal wing, jet nozzles disposed below the principal wing so as to jet the high-pressure gas in high-speed gasflows (which are composed of two kinds of gasflows, one being fan exhaust gasflow, the other being engine exhaust gasflow, these from the central portion of the lower surface of the principal wing toward the periphery of the same, and suction nozzles for sucking a secondary fluid, namely, the air outside the bowl-shaped space, into the bowl-shaped space by the agency of a suction generated by the jets of the high-pressure gas.

In this lift generating apparatus, an auxiliary wing having a diameter smaller than that of the principal wing is provided below the principal wing, the jet nozzles and the suction nozzles are formed between the principal wing and the auxiliary wing, and the auxiliary wing is formed in an upward convex curve so that the high-pressure gas jetted from the jet nozzles will flow along the upper surface of the auxiliary wing by a coanda effect.

The high-pressure gas producing unit may be selected from various high-pressure gas producing devices. Most preferably, a turbofan may be employed in the present invention.

Compressed air compressed by the turbofan of a turbofan engine may be supplied through the suction nozzles.

The lift generating apparatus may be provided with secondary suction nozzles to suck in air from outside the bowl-shaped space in addition to the suction nozzles. Moreover, the lift generating apparatus may be provided with combustion means in the bowl-shaped space for afterburning.

The jet nozzles may be arranged on the circumference of a circle. The jet nozzles may be provided respectively with shut valves to control the function of the jet nozzles so that the flow rates of the jets of the high-pressure gas in different radial directions are varied.

The lift generating apparatus may be combined with a cabin to form an aircraft.

In another aspect of the present invention, a lift generating method comprises jetting high-pressure gas into a bowl-shaped space opening downward, and sucking air into the bowl-shaped space from outside the bowl-shaped space by the suction of the high-speed flows of the high-pressure gas.

The air sucked into the bowl-shaped space, namely, a secondary fluid SA, may be sucked strongly by the negative pressure (vacuum) induced by coanda effect on the auxiliary wing.

When a turbofan engine is disposed substantially on the center axis of the bowl-shaped space, a torque acting in a direction opposite the direction of rotation of the turbofan, the exhaust gas of the turbofan engine may be jetted from the central portion of the bowl-shaped space in a direction inclined to the radial direction of the bowl-shaped space toward the direction of rotation of the turbofan.

According to the present invention, a mixed flow of the high-speed gas flows and an airflow produced by the suction of the high-speed gas flow in the bowl-shaped space increases the static pressure within the bowl-shaped space to generate lift. Since ambient air can be sucked at a high rate into the bowl-shaped space by the agency of the suction, namely, the special ejector function which is an ejector function combined with a coanda effect, of the high-speed gas flows, a large lift can be generated. Furthermore, since the high-pressure gasses jetted from the jet nozzles and flowing along the upper surface of the auxiliary wing disposed below the the principal wing and having an upward convex shape generates a negative pressure on the upper surface of the auxiliary wing, not only the ejector effect is further enhanced and a lift acts also on the auxiliary wing, whereby the lift generating ability of the lift generating apparatus is further enhanced, but also the noise generated of the high speed jet is said to be reduced by the coanda effect.

When the exhaust gas of the turbofan engine is used as the EG, the mixed gas flow has a comparatively high temperature, which enhances the lift generating ability of the lift generating apparatus.

The use of the compressed air produced by the turbofan of the turbofan engine as FG enables the use of a large amount of the ambient air.

When the ambient air is jetted from the secondary jet nozzles provided in addition to the jet nozzles, the ejector effect is enhanced to further increase the amount of effective air.

Burning the jetted gas for afterburning further augments the lift generating ability of the lift generating apparatus.

The arrangement of the jet nozzles on the circumference of a circle promotes the mixing of the high-pressure gas jetted from the jet nozzles and the ambient air which undergoes suction. Moreover, the regulation of the respective gas jetting rates of the jet nozzles by valves so that the gas jetting rates in different radial directions are varied generates a thrust for horizontal travel.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

Figure 1:
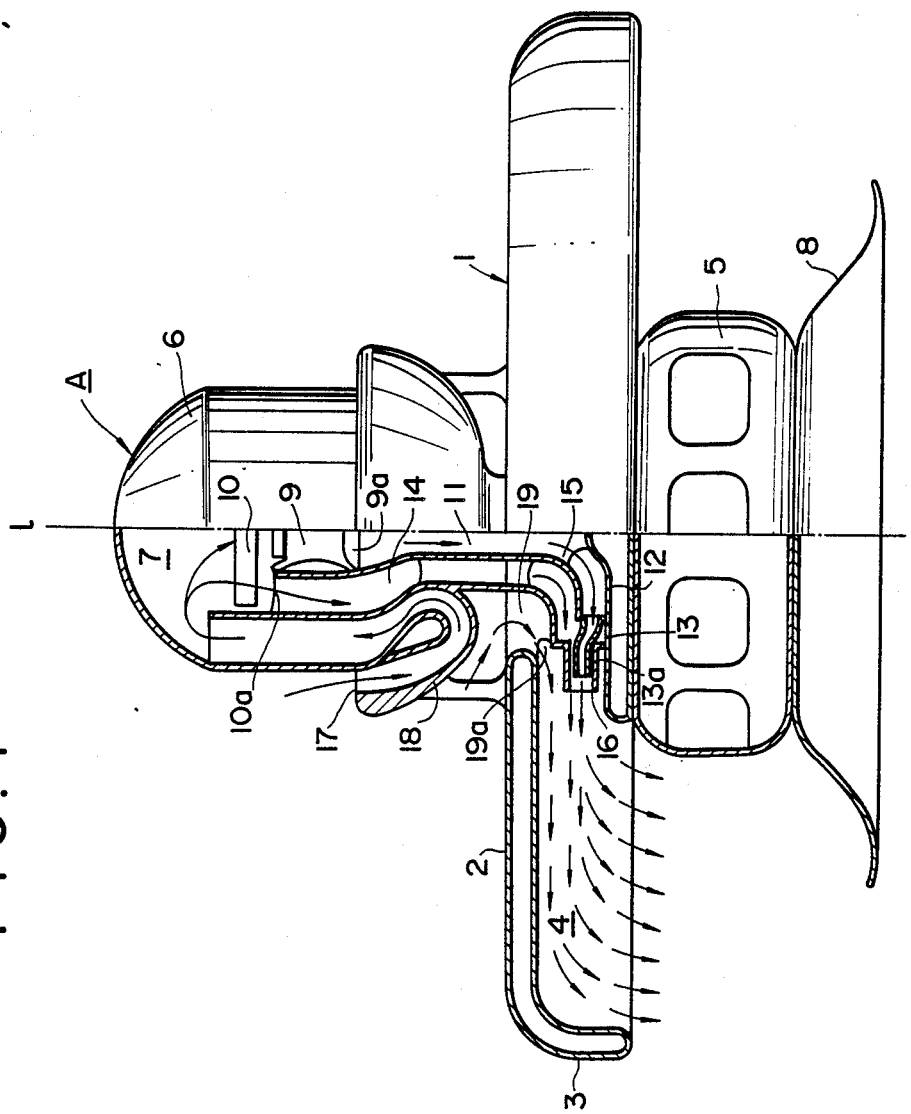
FIG. 1 is a longitudinal cross section of an aircraft incorporating a lift generating apparatus in a first embodiment according to the present invention.

Referring to FIG. 1, a generally circular principal wing 1 having the shape of a bowl has a horizontal hollow body 2 having the shape of a disk with a central hole, and an annular vertical wall 3 formed integrally with the body 2 so as to extend downward from the periphery of the body 2. The principal wing 1 defines a bowl-shaped space (hereinafter, referred to simply as "a space") 4 opening downward. A cabin 5 for accommodating a crew including a pilot is connected to the central portion of the lower surface of the body 2. A cylindrical engine frame 6 forming an engine room 7 is disposed in the central portion of the upper surface of the body 2. The principal wing 1, the cabin 5 and the engine frame 6 constitute the main structure of an aircraft A. Landing legs 8 are attached to the bottom of the cabin 5.

A vertical turbofan engine 9 having a turbofan 10, namely, a high-pressure gas producing device, is disposed with the turbofan 10 at an upper position and with the center axis thereof in alignment with the center axis Z of the engine room 7 (the center axes of the principal wing 1 and the space 4). The high-pressure high-temperature exhaust gas (EG) of the turbofan engine 9 exhausted through an exhaust opening 9a flows through a gas duct 11 toward a hollow, substantially disk-shaped first diffuser 12 disposed coaxially under the principal wing 1. A plurality of ejectors 13 respectively having jet nozzles 13a are arranged on the first diffuser 12 at regular angular intervals. The exhaust gas is distributed to the jet nozzles 13a and is jetted in horizontal gas flows through the jet nozzles 13a into the space under the principal wing 1 toward the periphery of the principal wing 1. The axis of each jet nozzle 13a is inclined in the direction of rotation of the turbofan 10 at an angle to the radius of the first diffuser 12 corresponding to the radius of the space 4 so that the gas flow jetted through the jet nozzle 13a has a tangential speed component to cancel a reactive torque acting on the aircraft in a direction opposite the direction of the torque of the turbofan 10 tending to turn the aircraft in a direction opposite the direction of rotation of the turbofan 10.

An air duct 14 for passing compressed air is extended around the gas duct 11 between the engine room 7 and the space 4. The upper end of the air duct 14 is connected to an air intake opening 10a for the turbofan 10 in the engine room 7, while the lower end of the air duct 14 is connected to a second diffuser 15 surrounding the first diffuser 12. A plurality of suction nozzles 16 disposed coaxially respectively with the nozzles 13a of the ejector 13 are connected to the second diffuser 15. The air taken into the engine room 7 and compressed by the turbofan 10 is distributed to the turbofan engine 9 and to the air duct 14. The compressed air supplied to the air duct 14 is distributed to the suction nozzles 16 by the second diffuser 15 and is discharged as FA through spaces around the nozzles 13a of the ejector 13 into the space 4. Indicated at 17 is an air intake opening for taking air into the engine room 7, and at 18 is an intake duct for guiding air taken into the engine room 7 through the air intake opening 17 to the turbofan 10. An air passage 19 is formed between the bottom wall of the engine frame 6 and the body 2 of the principal wing 1 to introduce air through the central portion of the body 2 of the principal wing 1 to a region of the space 4 above the suction nozzles 16. Air prevailing in the vicinity of the upper surface of the principal wing 1 is sucked through the air passage 19 by the suction of air currents jetted from the suction nozzles 16 and is sucked through second nozzles 19a opening into the space 4.

In operation, the exhaust gas of the turbofan engine 9 flows through the gas duct 11 and the first diffuser 12 and jets out horizontally through the nozzles 13a of the ejector 13 into the space 4 under the principal wing 1, while the compressed air compressed by the turbofan 10 flows through the air duct 14 and the second diffuser 15 and is discharged through the suction nozzles 16 into the space 4. The exhaust gas, i.e., EG, jetting at a high speed through the nozzles 13a provides an ejector effect by which the compressed air, i.e., a secondary fluid, is sucked through the suction nozzles 16 into the space 4, so that an increased amount of the compressed air is delivered into the space 4. The flow of a mixture of EG and FG causes the positive flow of the external air taken into the air duct 19 through the second suction nozzles 19a into the space 4, so that the amount of air supplied into the space 4 is further increased.

Thus, a large amount of a mixed gas, namely, a mixture of the exhaust gas and the external air, flows through the space 4 toward the vertical wall 3 of the principal wing 1. The flow speed of the mixed gas decreases rapidly as the mixed gas flows through the space 4 having a large capacity. The mixed gas is discharged in a downward flow from the space 4. The mixed gas introduced into the space 4 increases the static pressure within the space 4 to a pressure higher than the atmospheric pressure on the upper surface of the principal wing 1, so that lift acts on the principal wing 1.

Thus, a large lift is available because:

(1) The static pressure within the space 4 under the principal wing 1 is increased by the mixed gas introduced into the space 4 to positively generate a comparatively large lift as compared with the lift generated by the apparatus disclosed in Japanese Patent Laid-open (Kokai) No. 61=268597 which generates a lift by generating a negative pressure on the upper side of the principal wing.

(2) The external air is taken into the space 4, in addition to the exhaust gas of the turbofan engine 9, by both the suction of jets of the exhaust gas, namely, the ejector effect of the jets of the exhaust gas, and the suction of jets of the mixed gas, namely, a mixture of the combustion gas and the air sucked by the ejecting effect of the jets of the exhaust gas to introduce a large amount of gases into the space 4 in order that a comparatively large lift is generated.

Furthermore, the high-temperature mixed gas, namely, the mixture of the high-temperature exhaust gas of the turbofan engine 9 and the external air, increases the static pressure within the space 4 with a high efficiency, the flow of air sucked into the turbofan engine 9 along the upper surface of the principal wing 1 increases the absolute value of the negative pressure on the upper side of the principal wing 1 to increase the pressure difference between the upper side of the principal wing 1 and the lower side of the principal wing 1, which further promotes enhancement of lift.

Still further, the lift generating apparatus of the present invention generates far less noise than the lift generating apparatus of a rotor type because the lift generating apparatus of the present invention does not have such rotor and exhaust noise is reduced by covering double the high-speed flow of the exhaust gas, which is the principal source of noises, by the low-speed flows of air taken into the apparatus. Furthermore, since the lift generating apparatus of the present invention has a high lift generating efficiency as mentioned above, the principal wing 1 may be comparatively small, and an aircraft incorporating the lift generating apparatus of the present invention is compact and lightweight in construction, since the lift generating apparatus of the present invention eliminates heavy components which are necessary for the conventional helicopter, such as the reduction gear for transmitting power to the rotors, and tail rotor driving shaft. A second embodiment of the present invention is shown in FIGS. 2-5.

Figure 2:
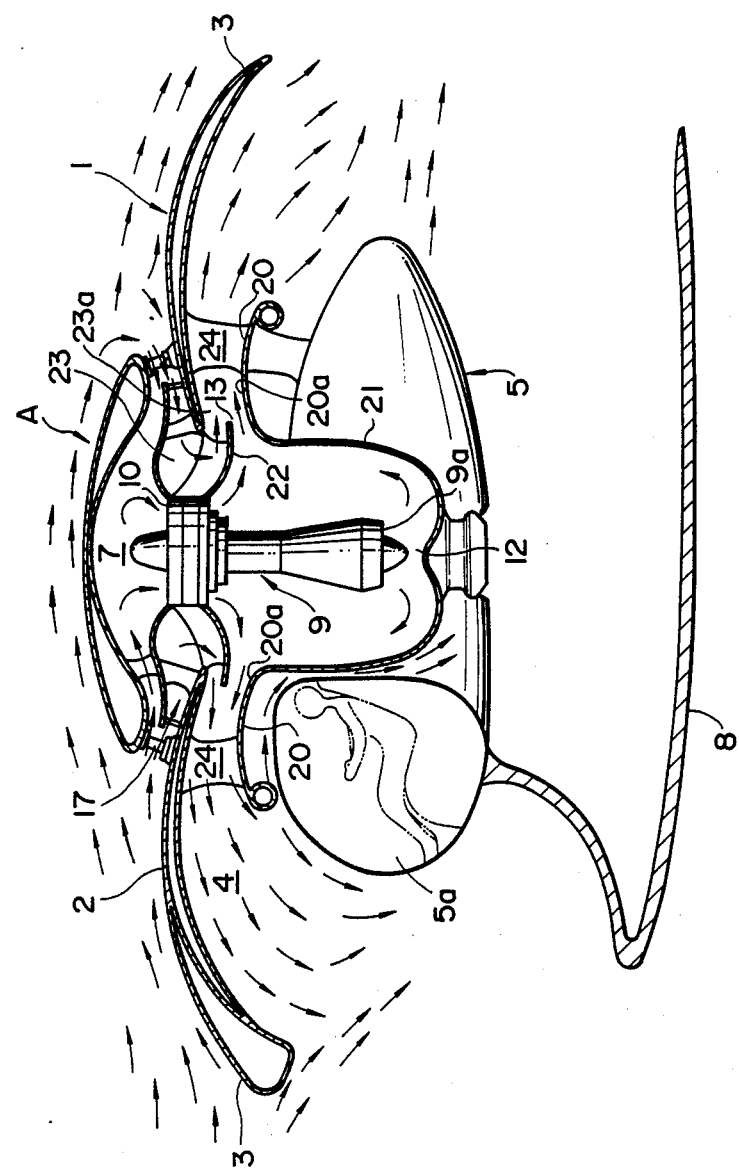
FIG. 2 is a schematic sectional view of an aircraft incorporating a lift generating apparatus in a second embodiment according to the present invention.
Figure 3:
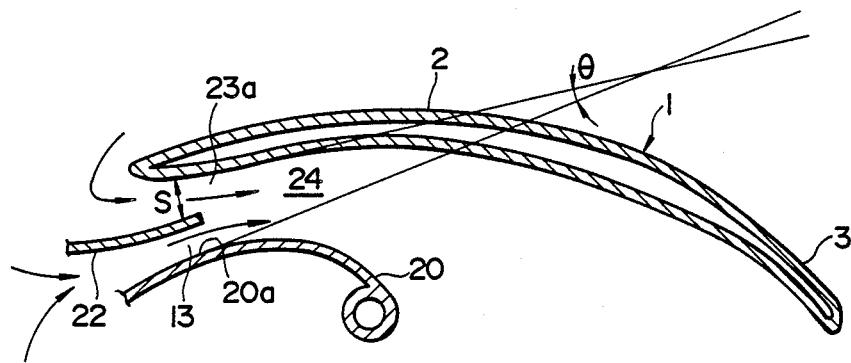
FIG. 3 is an enlarged fragmentary sectional view of a portion of the lift generating apparatus of FIG. 2.

In FIGS. 2 and 3, parts like or corresponding to those previously described with reference to FIG. 1 are denoted by the same reference numerals and only the parts and constitution different from those of the first embodiment will be described to avoid duplication.

An auxiliary wing 20 having a diameter smaller than that of a principal wing 1 is disposed below the principal wing 1. The auxiliary wing 20 is formed integrally with the bottom cover 21 of a turbofan engine 9. A partition wall 22 serving also as the side cover of the turbofan engine 9 is disposed between the principal wing 1 and the auxiliary wing 20. Thus, the principal wing 1 and the partition wall 22 form an annular air intake passage 23 and an annular suction opening 23a, the auxiliary wing 20 and the partition wall 22 form an annular ejector 13, and the principal wing 1 and the auxiliary wing 20 form a fluid passage 24 outside the suction opening 23a and the ejector 13.

A mixed gas, namely, a mixture of the exhaust gas of the turbofan engine 9 and compressed air compressed by the turbofan 10 of the turbofan engine 9, is jetted as a primary fluid FG+EG through the ejector 13. Air is sucked in through the suction opening 23a by the special ejector effect of the mixed gas jetted through the ejector 13.

The principal wing 1 is formed generally in the shape of a shallow pan and has a body 2 and a declining wall 3 forming a smooth, continuous curved surface. The upper surface 20a of the auxiliary wing 20 is formed in an upward convex curved surface and is disposed, as shown in FIG. 3 in an enlarged view, so that the gap between the principal wing 1 and the auxiliary wing 20 decreases from the central portion toward the middle portion of the auxiliary wing 20, and then increases from the middle portion toward the peripheral portion of the auxiliary wing 20, namely, the upper surface 20a of the auxiliary wing 20 is curved so that the gap between the lower surface of the principal wing 1 and the upper surface 20a of the auxiliary wing 20 becomes a minimum value in the middle portion of the auxiliary wing 20. The upper surface 20a of the auxiliary wing 20, i.e., the lower surface of the fluid passage 24, formed in such a curved surface provides a Coanda effect to cause the jet of the fluid jetted through the ejector 13 to travel along the contour of the curved upper surface 20a of the auxiliary wing 20. The Coanda effect provides the following advantages.

(1) The efficiency of the suction of the external air is increased remarkably since the Coanda effect increases the absolute value of the negative pressure on the side of the upper surface 20a of the auxiliary wing 20. The noise of the high speed jet is also reduced by the Coanda effect.

(2) Lift generated by the negative pressure on the side of the upper surface 20a of the auxiliary wing 20 acts on the auxiliary wing 20.

Thus, the Coanda effect increases the total lift acting on an aircraft incorporating the lift generating apparatus in the second embodiment as compared with the total lift acting on the aircraft incorporating the lift generating apparatus in the first embodiment.

It is desirable, in view of the further enhancement of the Coanda effect, to design the respective portions of the principal wing 1, the partition wall 22 and the auxiliary wing 20 corresponding to the suction opening 23a and the ejector 13 so that the direction of flow of the secondary fluid sucked through the suction opening 23a is substantially parallel to the direction of flow of the primary fluid jetted through the ejector 13.

Figure 4:
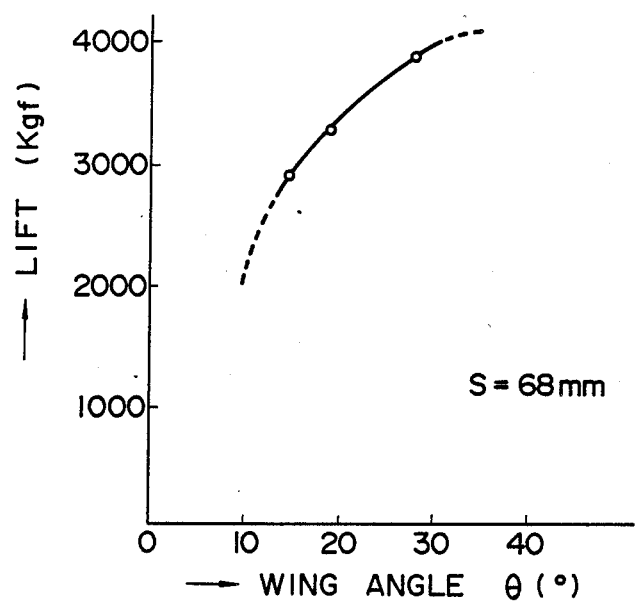
FIGS. 4 and 5 are graphs showing the lift characteristics of the lift generating apparatus of FIG. 2.
Figure 5:
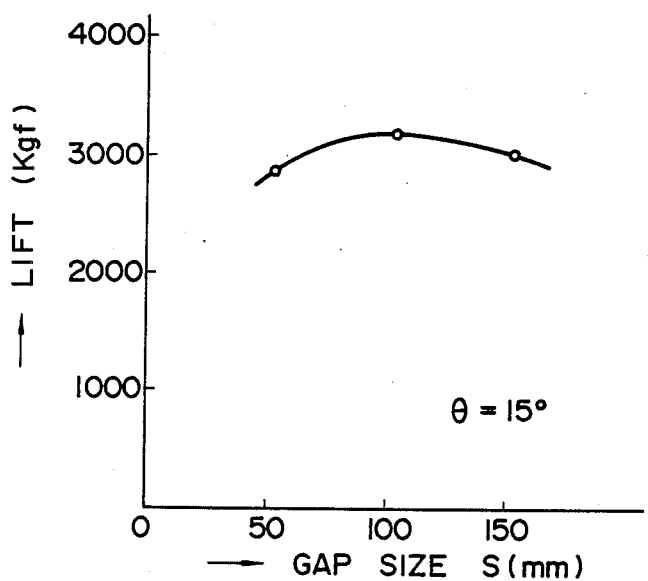

It was found that the existence of vortices in the fluid passage 24 varies entailing variation in the lift acting on the aircraft A depending on the angle $\theta$ between a tangent to the principal wing 1 at a position corresponding to the entrance of the fluid passage 24 and a tangent to the auxiliary wing 20 at the same position (hereinafter, referred to as "a wing angle"), and the size S of the gap between the principal wing 1 and the partition wall 22 at the position corresponding to the entrance of the fluid passage 24. FIG. 4 shows the relation between the wing angle $\theta$ and the lift when S=68 mm. FIG. 5 shows the relation between the wing angle $\theta$ and the gap size S when the wing angle $\theta$=15°. Accordingly, the lift and attitude of the aircraft A during flight can be controlled by properly determining the wing angle $\theta$ and the gap size S or by regulating the wing angle $\theta$ and the gap size S during flight.

The lift may be regulated by regulating the general inclination of the auxiliary wing 20 or by constructing the auxiliary wing 20 of a plurality of annular subwings and individually regulating the inclination of each subwing.

It is also possible to regulate the lift by moving the auxiliary wing 20 in vertical directions to vary the distance between the principal wing 1 and the auxiliary wing 20 or by moving the auxiliary wing 20 in horizontal directions to bias the auxiliary wing 20 relative to the principal wing 1. Furthermore, it is possible to control the flying attitude of the aircraft A by regulating the lift through the remote control operation of a flap attached to the outer periphery of the auxiliary wing 20. It is possible to generate a horizontal thrust, i.e., the horizontal component of the lift, for the horizontal travel of the aircraft A by controlling the attitude, i.e., the tilt, of the aircraft A by regulating the auxiliary wing 20.

The second embodiment is different further from the first embodiment in the following respects. In the second embodiment, the cabin 5 is a substantially U-shaped shell having a flight compartment 5a in the front section thereof. The bottom half of the engine room 7 extend through the central portion of the principal wing 1 and is placed in the central portion of the cabin 5. The aircraft A incorporating the lift generating apparatus in the second embodiment has a height smaller than that of the aircraft A incorporating the lift generating apparatus of the first embodiment, and is formed generally in a substantially streamlined shape. Accordingly, lift generated by air currents acts on the aircraft A during horizontal travel, which reduces the load on the engine.

Figure 6:
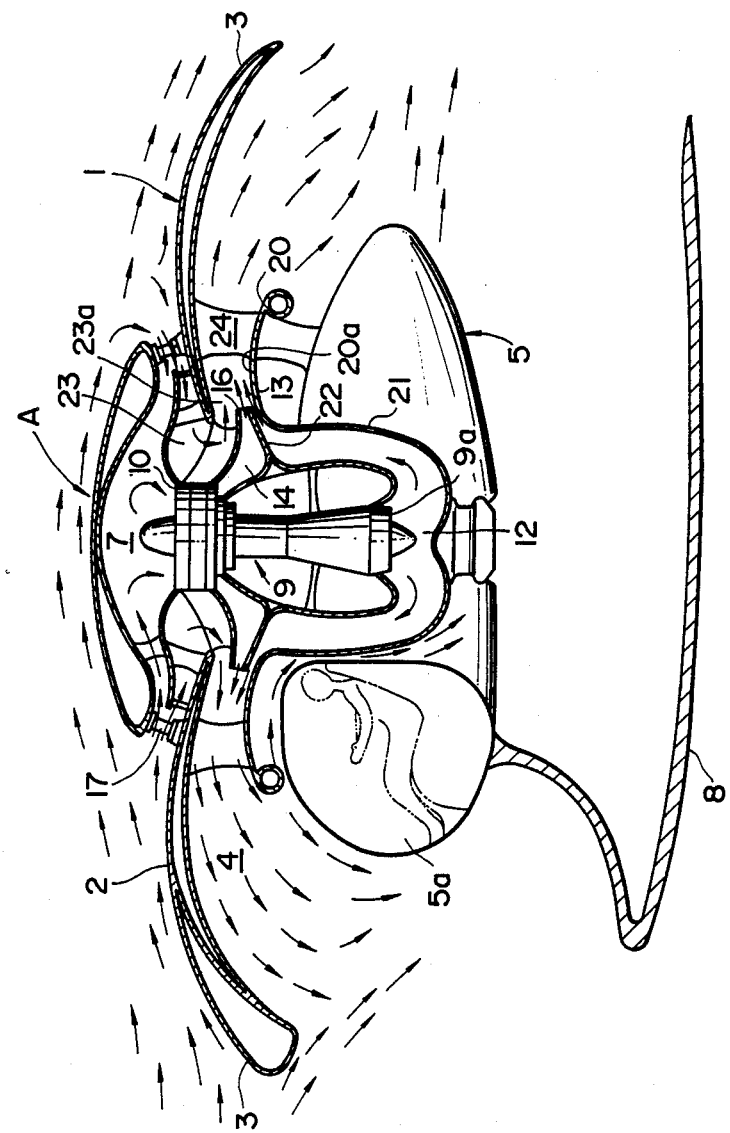
FIG. 6 is a schematic sectional view of an aircraft incorporating a lift generating apparatus in a third embodiment according to the present invention.

In the second embodiment, a mixed gas, namely, a mixture of the exhaust gas of a turbofan engine 9 and compressed air produced by the turbofan 10 of the turbofan engine 9, is jetted through the ejector 13 as a primary fluid. However, it is also possible, similarly to the first embodiment, to use the exhaust gas of the turbofan engine 9 as the primary fluid, to suck in the compressed air produced by the turbofan 10 of the turbofan engine 9 as the secondary fluid through the suction opening 16 and to suck in the external air through the air intake passage 23 by the ejector effect of the flow of the mixed gas of the primary and secondary fluids as shown in FIG. 6. Thus, the individual use of the primary and secondary fluids reduces the difference in flow speed between the air sucked in through the air intake passage 23 and the secondary fluid scarcely varying the ejector effect, so that losses can be reduced.

Other possible modifications in accordance with the present invention are as follows:

(1) In view of the capability of producing a high-temperature combustion gas which contributes to the enhancement of lift, the turbofan engine is an optimum high-pressure gas producing device. However, other devices functionally equal to the turbofan engine may be used. The high-pressure gas need not necessarily be a high-temperature gas to achieve the object of the present invention, a device which produces a high-pressure gas of an ordinary temperature may be used as the high-pressure gas producing device. When a high-pressure gas producing device not provided with any turbofan is employed, the nozzles 13a of the ejector 13 may be arranged radially since a torque to cancel a torque reactive to the rotation of the turbofan need not be generated.

(2) The combination of burning means, such as afterburners, respectively with the nozzles 13a of the ejector 13 within the space 4 for afterburning the combustion gas further augments the lift. The individual regulation of the degree of afterburning at the nozzles 13a of the ejector 13 arranged at angular intervals enables attitude control. Provision of the aircraft with emergency compressed air as a safety measure enables gliding and soft emergency landing by controlling the attitude by circumferentially irregular afterburning in case the engine malfunctions or stops.

(3) The ejector 13 may be replaced with a circular structure comprising an upper disk, a lower disk disposed coaxially with the upper disk, and partition plates arranged at angular intervals between the upper and lower disks in the peripheral portions of the upper and lower disks so as to extend radially or at an angle to the radial direction.

(4) The principal wing 1 may be provided with jet nozzles to jet a portion of the high-pressure gas horizontally outward to propel the aircraft for horizontal flight by a thrust derived by reaction to the ejection of the high-pressure gas through the jet nozzle in a jet. It is possible to provide the aircraft, instead of or in combination with the jet nozzles, with a thrust producing means including valves combined respectively with the nozzles 13a of the ejector 13 of the first embodiment. The valves are controlled individually to vary the combustion gas ejecting rate with respect to circumferential position to produce a horizontal thrust. For example, the valves combined with the nozzles 13a in the front section are closed while the valves combined with the nozzles 13a in the rear section are opened for forward flight.

The shape of the principal wing 1 need not necessarily be circular, but may be elliptic.

As is apparent from the foregoing description, according to the present invention, high-pressure gas and air withdrawn from the ambience by suction developed by the ejector effect of jets of the high-pressure gas are jetted in a bowl-shaped space formed under a principal wing to generate lift by raising the static pressure within the space. Accordingly, the mixed gas is supplied at a high flow rate into the space, so that the static pressure under the principal wing is increased positively to generate a large lift.

Provision of an upward convex auxiliary wing having a curved surface capable of causing the jet of high-pressure gas jetted from nozzles to flow along the contour of the curved surface under the principal wing enhances the ejector effect, so that the mixed gas is supplied into the space at an increased flow rate and lift acts on the auxiliary wing. Consequently, further increased lift is generated.

The use of the combustion gas of a turbofan engine as the high-pressure gas increases the temperature of the mixed gas; consequently, further increased lift is generated.

The use of compressed air compressed by the turbofan of the turbofan engine increases the supply of the external air into the space.

The provision of secondary suction nozzles in addition to primary suction nozzles for taking in air to be mixed with the combustion gas further increases the supply of external air.

The afterburning of the gas jetted into the space further increases the lift.

The provision of valves in combination with nozzles for jetting the combustion gas enables the production of thrust for horizontal flight by individually controlling the valves to regulate the respective flow rates of jets of the combustion gas jetted from the nozzles.

Elimination of rotors which generate a large amount of noise of low frequencies and employment of a turbofan engine provides an aircraft which generates comparatively low noises.

Although the invention has been described in its preferred forms with a certain degree of particularity, obviously many changes and variations are possible therein. It is therefore to be understood that the invention may be practiced otherwise than specifically described herein without departing from the scope and spirit thereof.

What is claimed is:

1. A lift generating apparatus comprising:
   a circular principal wing having a peripheral portion thereof bent downward, forming a space opening downwardly thereunder;
   a high-pressure gas producing device provided on the principal wing,
   a plurality of jet nozzles provided within a central portion of the space for jetting a high-pressure gas compressed by said gas producing device and jetting by said gas producing device in a direction radially outward from the central portion of the bowl-shaped space;
   a plurality of suction nozzles disposed coaxially with said jet nozzles, said suction nozzles being communicated with said gas producing device for sucking external air as a secondary fluid from outside the bowl-shaped space by suction generated by jets of the high-pressure gas jetted from the gas producing device.

2. A lift generating apparatus according to claim 1, which comprises an auxiliary wing smaller than the principal wing and which is disposed below the principal wing, wherein the jet nozzles and the suction holes are arranged between the principal wing and the auxiliary wing, and the auxiliary wing comprises an upwardly convex curved shaped wing for causing the jets of the high-pressure gas jetted from the jet nozzles to flow along the upper surface thereof.

3. A lift generating apparatus according to claim 1 or 2, wherein the high-pressure gas producing device comprises a turbofan engine.

4. A lift generating apparatus according to claim 3, which comprises means for connecting the compressed air delivery opening of the turbofan engine to the suction nozzles so that the compressed air compressed by a turbofan of the turbofan engine as the secondary fluid is guided to the suction openings.

5. A lift generating apparatus according to claim 1, which comprises afterburning means provided within the bowl-shaped space radially outside the jet nozzles, respectively.

6. A lift generating apparatus according to claim 1, wherein the jet nozzles are arranged substantially on the circumference of a circle.

7. An aircraft comprising:
   a circular principal wing having a peripheral portion thereof bent downward, forming a bowl-shaped space opening downwardly thereunder;
   a high-pressure gas producing device provided on the principal wing;
   a plurality of jet nozzles provided within a central portion of the bowl-shaped space for jetting a high-pressure gas jetted by the high-pressure gas producing device radially outward from the central portion of the bowl-shaped space; and
   a plurality of suction nozzles disposed coaxially with said jet nozzles, said suction openings being communicated with said gas producing device for sucking external air as a secondary fluid from outside the bowl-shaped space by suction generated by the jets of the high-pressure gas jetted from the jet nozzles; and
   a cabin connected to the principal wing.

8. The aircraft according to claim 7, which comprises an auxiliary wing smaller than the principal wing and which is disposed below the principal wing, wherein the jet nozzles and the suction openings are arranged between the principal wing and the auxiliary wing, and the auxiliary wing comprises an upwardly convex curve shaped wing for causing the jets of the high-pressure gas jetted from the jet nozzles to flow along the upper surface thereof.

9. An aircraft according to claim 7, wherein said gas producing device comprises a turbojet engine which comprises means for connecting the compressed air delivery opening of the turbofan engine to the suction nozzles so that the compressed air compressed by the turbofan of the turbofan engine as the secondary fluid is guided to the suction nozzles.

10. An aircraft according to claim 7, which comprises afterburning means provided within the bowl-shaped space radially outside the jet nozzles, respectively.

11. An aircraft according to claim 7, wherein the jet nozzles are arranged substantially on the circumference of a circle.

12. An aircraft according to claim 7, which comprises a plurality of valves provided respectively in combination with each of the jet nozzles.

13. A lift generating method which comprises:
    jetting a high-pressure gas at a high flow speed into a bowl-shaped space opening downwardly;
    sucking external air as a secondary fluid from outside the bowl-shaped space into the bowl-shaped space by suction generated by the jet of the high-pressure gas and coaxially of said high pressure gas jetted at a high flow speed; and
    compressing the external air as the secondary fluid into the bowl-shaped space by a gas producing device.

* * * * *